United States Patent
Bourque

(10) Patent No.: US 9,224,359 B2
(45) Date of Patent: *Dec. 29, 2015

(54) IN-BAND PERIPHERAL AUTHENTICATION

(75) Inventor: Francis P. Bourque, Mundelein, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 846 days.

This patent is subject to a terminal disclaimer.

(21) Appl. No.: 13/245,437

(22) Filed: Sep. 26, 2011

(65) Prior Publication Data

US 2013/0080662 A1   Mar. 28, 2013

(51) Int. Cl.
| | |
|---|---|
| G06G 5/00 | (2006.01) |
| G06F 21/44 | (2013.01) |
| G06F 21/85 | (2013.01) |
| H04N 5/44 | (2011.01) |
| H04N 21/4363 | (2011.01) |
| H04N 21/4367 | (2011.01) |
| G09G 5/00 | (2006.01) |

(52) U.S. Cl.
CPC ........... *G09G 5/006* (2013.01); *G06F 21/44* (2013.01); *G06F 21/85* (2013.01); *H04N 5/4401* (2013.01); *H04N 21/4367* (2013.01); *H04N 21/43635* (2013.01); *G06F 2221/2105* (2013.01); *G06F 2221/2129* (2013.01); *G09G 2370/042* (2013.01); *G09G 2370/047* (2013.01); *G09G 2370/12* (2013.01)

(58) Field of Classification Search
CPC ............. G09G 5/006; G09G 2370/12; G09G 2370/042; G09G 2370/047; G06F 21/44; G06F 21/85; G06F 2221/2105; G06F 2221/2129; H04N 5/4401; H04N 21/43635; H04N 21/4367

See application file for complete search history.

(56) References Cited

U.S. PATENT DOCUMENTS

| | | |
|---|---|---|
| 5,028,859 A | 7/1991 | Johnson et al. |
| 6,381,477 B1 | 4/2002 | Johnson, Jr. et al. |
| 7,028,105 B2 | 4/2006 | Dute et al. |
| 7,242,923 B2 | 7/2007 | Perera et al. |
| 7,451,064 B2 | 11/2008 | Hodge et al. |
| 7,498,766 B2 | 3/2009 | Paul et al. |
| 7,571,263 B2 | 8/2009 | Campello et al. |
| 7,598,700 B2 | 10/2009 | Elder et al. |
| 7,656,867 B2 | 2/2010 | Herbert |

(Continued)

FOREIGN PATENT DOCUMENTS

| | | |
|---|---|---|
| CN | 201438370 U | 4/2010 |
| EP | 1422625 A1 | 5/2004 |

(Continued)

OTHER PUBLICATIONS

Jinrong Qian, "Battery Authentication Improves Battery Security", EE Times-India/eetindia.com, Sep. 10, 2008, 4 pages.

(Continued)

*Primary Examiner* — Eric Oberly
(74) *Attorney, Agent, or Firm* — Byrne Poh LLP

(57) ABSTRACT

This document describes techniques (300, 400) and apparatuses (100, 500, 600, 700) for in-band peripheral authentication. These techniques (300, 400) and apparatuses (100, 500, 600, 700) may communicate via a non-media channel allowing host device (102) to authenticate peripheral (106), enable an enhanced operational mode of the host device (102), and/or provide content configured for the peripheral (106) without the use of out-of-band signaling.

21 Claims, 7 Drawing Sheets

(56) References Cited

U.S. PATENT DOCUMENTS

| | | | |
|---|---|---|---|
| 7,679,629 B2* | 3/2010 | Neuman et al. | 345/698 |
| 7,734,933 B1 | 6/2010 | Marek et al. | |
| 7,752,675 B2 | 7/2010 | Lee | |
| 8,225,385 B2 | 7/2012 | Chow et al. | |
| 8,310,408 B1* | 11/2012 | Walker et al. | 345/3.3 |
| 8,667,303 B2* | 3/2014 | Nasir et al. | 713/189 |
| 2003/0197512 A1 | 10/2003 | Miller et al. | |
| 2003/0210786 A1* | 11/2003 | Carr | 380/241 |
| 2004/0124996 A1 | 7/2004 | Andersen | |
| 2004/0243700 A1* | 12/2004 | Weast | 709/224 |
| 2005/0114896 A1* | 5/2005 | Hug et al. | 725/88 |
| 2005/0149450 A1* | 7/2005 | Stefik et al. | 705/58 |
| 2005/0182860 A1 | 8/2005 | Schneckenburger | |
| 2005/0210279 A1* | 9/2005 | Lee et al. | 713/194 |
| 2005/0251589 A1 | 11/2005 | Wang | |
| 2005/0286546 A1* | 12/2005 | Bassoli et al. | 370/432 |
| 2006/0190653 A1 | 8/2006 | Wahler et al. | |
| 2006/0277339 A1 | 12/2006 | Sakaki et al. | |
| 2007/0081506 A1 | 4/2007 | Yamada | |
| 2007/0143488 A1* | 6/2007 | Pantalone | 709/230 |
| 2007/0214296 A1 | 9/2007 | Takamatsu et al. | |
| 2008/0091762 A1 | 4/2008 | Neuhauser et al. | |
| 2008/0092211 A1* | 4/2008 | Klemets et al. | 726/3 |
| 2008/0134237 A1* | 6/2008 | Tu et al. | 725/38 |
| 2008/0186403 A1 | 8/2008 | Douillet | |
| 2009/0049307 A1 | 2/2009 | Lin | |
| 2009/0061678 A1 | 3/2009 | Minoo et al. | |
| 2009/0083834 A1 | 3/2009 | Rubinstein et al. | |
| 2009/0178086 A1* | 7/2009 | Unger | 725/81 |
| 2009/0307734 A1 | 12/2009 | Doi et al. | |
| 2010/0022277 A1 | 1/2010 | An et al. | |
| 2010/0075604 A1 | 3/2010 | Lydon et al. | |
| 2010/0146134 A1 | 6/2010 | Kobayashi et al. | |
| 2010/0161860 A1 | 6/2010 | Chien et al. | |
| 2010/0271486 A1* | 10/2010 | Bohm | 348/180 |
| 2010/0295384 A1 | 11/2010 | Kobayashi | |
| 2010/0325298 A1* | 12/2010 | Nelson | 709/229 |
| 2011/0055407 A1 | 3/2011 | Lydon et al. | |
| 2011/0113442 A1* | 5/2011 | Kikkawa | 725/25 |
| 2012/0021808 A1 | 1/2012 | Tseng | |
| 2012/0030393 A1 | 2/2012 | Ganesh et al. | |
| 2012/0071134 A1 | 3/2012 | Jensen | |
| 2012/0131230 A1 | 5/2012 | Ady et al. | |
| 2013/0050582 A1* | 2/2013 | Tran et al. | 348/724 |

FOREIGN PATENT DOCUMENTS

| | | |
|---|---|---|
| JP | 201092202 A | 4/2010 |
| WO | 97/37305 A1 | 10/1997 |
| WO | 2012071133 A4 | 5/2012 |

OTHER PUBLICATIONS

Patent Cooperation Treaty, "PCT Search Report and Written Opinion of the International Searching Authority" for International Application No. PCT/US2011/058510, May 11, 2012, 18 pages.

Hewlett-Packard Company et al., "Universal Serial Bus 3.0 Specification", USB Implementers Forum, vol. 1.0, Nov. 12, 2008, pp. 5-33-5-34.

United States Patent and Trademark Office, "Non-Final Rejection" for U.S. Appl. No. 12/951,467, Mar. 28, 2013, 14 pages.

United States Patent and Trademark Office, "Non-Final Rejection" for U.S. Appl. No. 12/982,981, Mar. 30, 2012, 16 pages.

United States Patent and Trademark Office, "Notice of Allowance and Fee(s) Due" for U.S. Appl. No. 12/982,981, Dec. 12, 2012, 12 pages.

Patent Cooperation Treaty, "PCT Search Report and Written Opinion of the International Searching Authority" for International Application No. PCT/US2012/055321, Apr. 9, 2013, 18 pages.

Digital TV Design Line, "The Nuts and Bolts of HDCP", Feb. 20, 2008, 5 pages.

Irfan Nasir et al., "Peripheral Authentication", U.S. Appl. No. 12/951,467, filed Nov. 22, 2010.

International Preliminary Report on Patentability dated Apr. 1, 2014 in International Patent Application No. PCT/US2012/055321.

* cited by examiner

IN-BAND PERIPHERAL AUTHENTICATION

BACKGROUND

Computing devices are often accessorized by their users to enable features of the computing devices. A desktop computer can be accessorized with various peripherals, such as an external display or speakers. A tablet computer can be accessorized with a web-camera or video-out adapter. A smartphone can be accessorized with a docking station, an external keyboard, or an external display. These are just a few of many ways in which users accessorize computing devices with peripherals. Some peripherals, however, are not properly designed to make use of these features, such as applications or services, resulting in features that are unusable or function incorrectly.

BRIEF DESCRIPTION OF THE DRAWINGS

Techniques and apparatuses for in-band peripheral authentication are described with reference to the following drawings. The same numbers are used throughout the drawings to reference like features and components.

DETAILED DESCRIPTION

Host computing devices often fail to authenticate a peripheral before use of that peripheral. Failing to authenticate may result in impaired operation, or less than full use of, features of the host computing device or peripheral. This disclosure describes techniques and apparatuses for in-band peripheral authentication that can protect host computing devices from improperly designed peripherals or permit peripherals to be more-fully used.

The following discussion first describes an operating environment, followed by techniques that may be employed in this environment, and ends with example apparatuses.

Operating Environment

Figure 1:
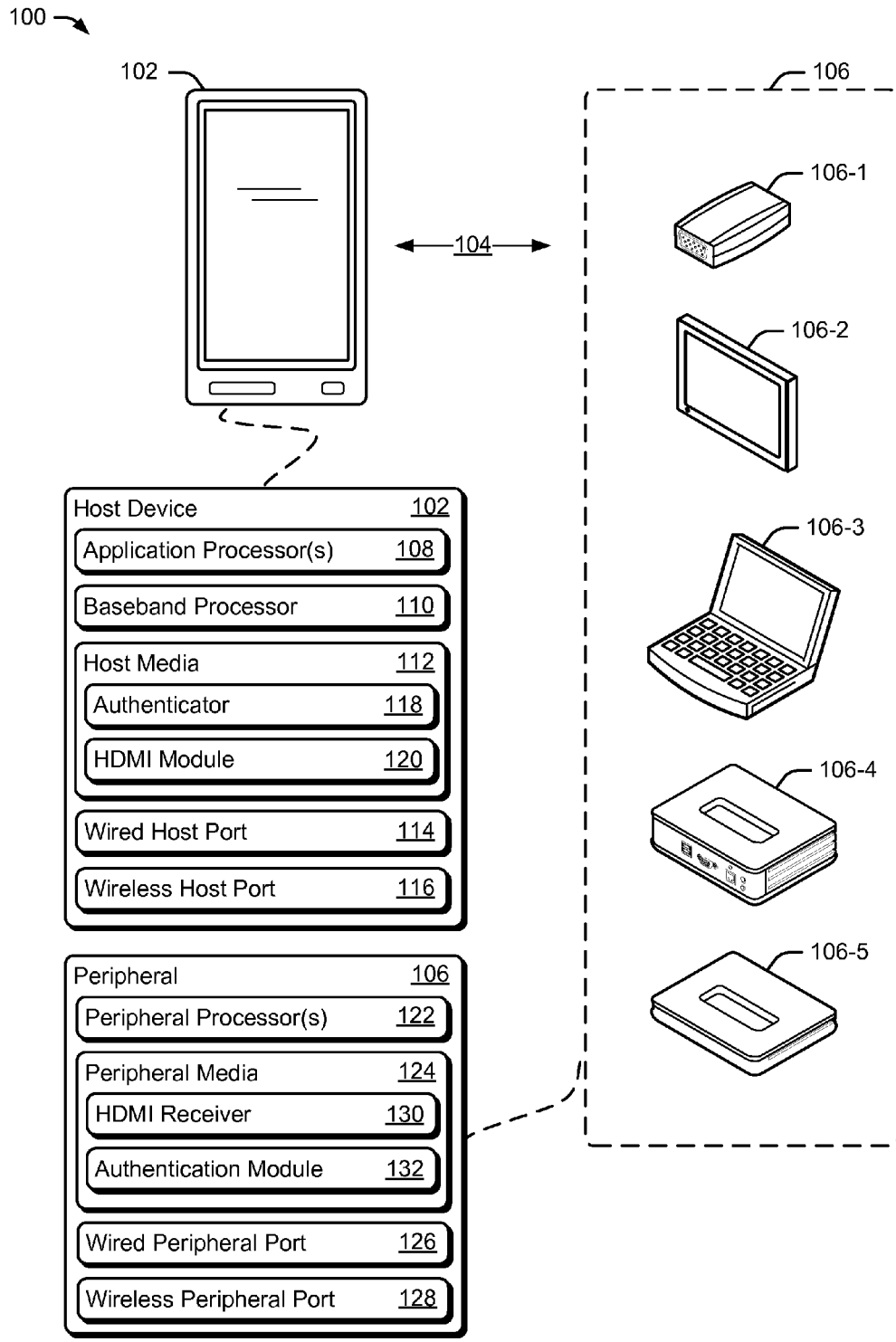
FIG. 1 illustrates an example environment in which techniques for in-band peripheral authentication can be implemented.

FIG. 1 illustrates an example environment 100 in which techniques for in-band peripheral authentication can be implemented. The example environment 100 includes a host device 102, a communication medium 104, and a peripheral 106. The host device 102 can be, or include, many different types of computing devices, such as a smartphone, a cellular phone having limited computational abilities, a laptop, a tablet computer, or a desktop computer.

Host device 102 includes application processor(s) 108, baseband processor 110, host computer-readable media 112 (host media 112), a wired host port 114, and/or a wireless host port 116. Host media 112 includes authenticator 118, which authenticates peripheral 106, alone or in conjunction with other elements of host device 102 or peripheral 106. In this example host device, host media also includes high definition multimedia interface (HDMI) module 120 for processing or distributing multimedia content.

Peripheral 106 can be one of many different types of devices capable of communication with, providing a service to, or extending a functionality of host device 102. Five example peripherals are shown, though others are contemplated. These example peripherals include a video graphics array (VGA) display adapter 106-1, a liquid crystal display 106-2, a laptop-dock 106-3, a docking station 106-4 having an array of input/output ports, and a travel dock 106-5.

Peripheral 106 includes peripheral processor(s) 122, peripheral computer-readable media 124 (peripheral media 124), wired peripheral port 126, and/or wireless peripheral port 128. Peripheral media 124 includes HDMI receiver 130 and authentication module 132. HDMI receiver is configured to receive and process multimedia content for format conversion, viewing, output, or relay. Authentication module 132 is configured to respond to an authentication request received from host device 102, the response indicating that the peripheral device is authentic.

Communication medium 104 provides a wired or wireless medium by which host device 102 and peripheral 106 may communicate. Examples include a wired medium from wired peripheral port 126 to wired host port 114 or a wireless medium of a wireless connection communicating via wireless peripheral port 128 and wireless host port 116. Example wireless networks include wide-area networks (WAN), local-area networks (LAN), and personal-area networks (PAN), each of which may be configured, in part or entirely, as infrastructure, ad-hoc, or mesh networks. Baseband processor 110 may provide a cellular capability via wireless host port 116 for communication over one or more wireless WAN networks.

Alternately or additionally, in the case of a wireless medium, wireless endpoints or dongles (not shown) may be connected to wired ports of either host device 102 or peripheral 106 to implement (either in part or whole) techniques described herein. For example, wireless endpoints connected to HDMI ports of host device 102 or peripheral 106 can enable data transactions and/or content delivery described herein to occur without the use of a wired medium.

Figure 2:
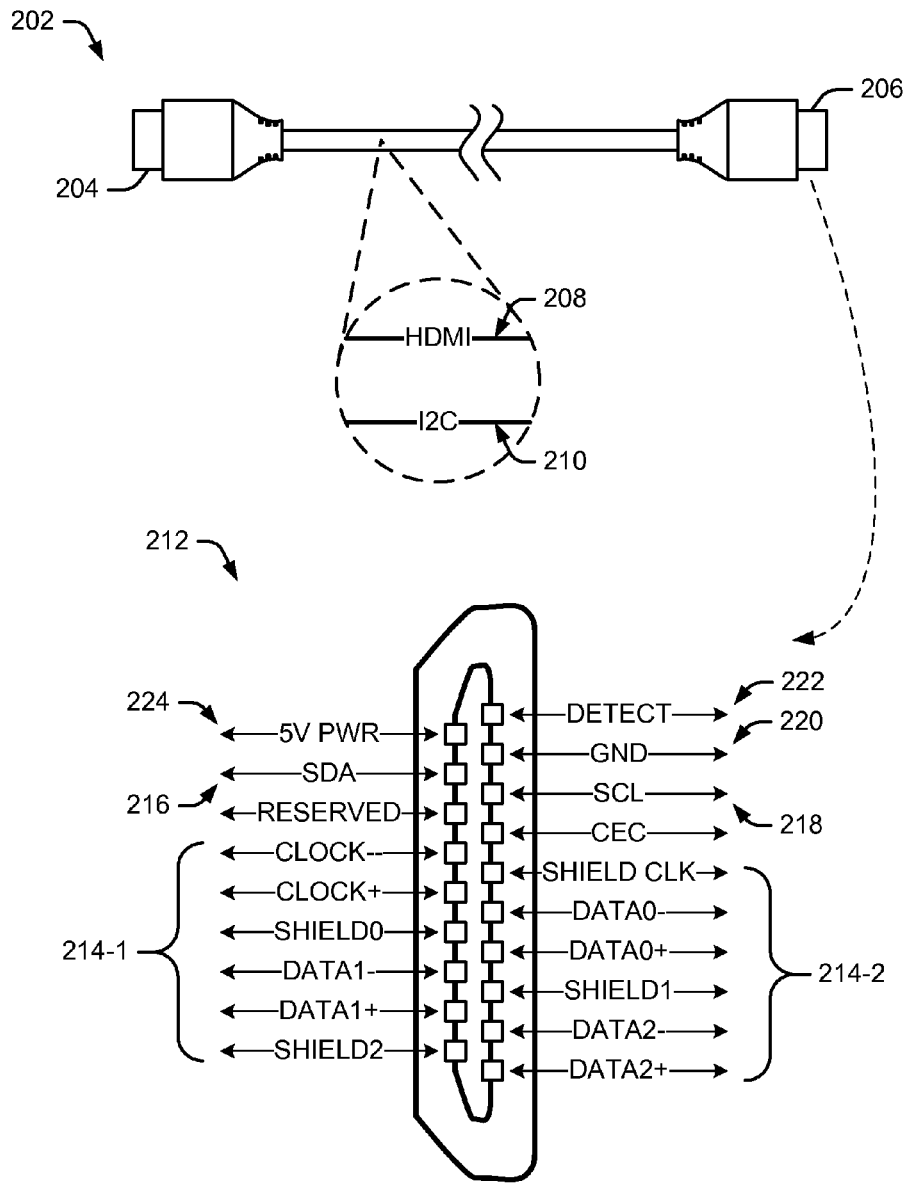
FIG. 2 illustrates an example of a communication medium illustrated in FIG. 1, the example being a high definition multimedia interface (HDMI) cable.

FIG. 2 illustrates an example of communication medium 104, the example being a high definition multimedia interface (HDMI) cable 202. In this particular example, HDMI cable 202 is shown as a Type A cable, although the use of other types of HDMI cables are contemplated, such as Type B (mini) and Type C (micro) variants of HDMI cables. HDMI cable 202 is terminated by HDMI connectors 204 and 206, although other custom or proprietary connectors may be used.

The example HDMI cable 202 includes a medium for two in-band communication channels, HDMI communication channel 208 (HDMI channel 208) and inter-integrated circuit ($I^2C$) communication channel 210 ($I^2C$ channel 210). As shown by detailed pin-out 212, HDMI channel 208 is configured to communicate video and/or audio information via data and clock signals 214-1 and 214-2. $I^2C$ channel 210 is configured to communicate non-media data via serial data (SDA) signal line 216 and serial clock (SCL) signal line 218 which can be referenced to ground (GND) signal line 220. Medium for additional handshake and/or detection pins, such as detect signal line 222, is also present in HDMI cable 202, which may be re-purposed for implementing the techniques described herein.

I²C channel 210 may implement various industry protocols such as High-bandwidth Digital Content Protection (HDCP), Display Data Channel (DDC), or Enhanced Data Display Channel (E-DDC) to communicate with components of peripheral 106. In some implementations, 5 volt power (5V PWR) signal line 224 or other various signal lines of HDMI cable 202 may also be used by techniques of in-band authentication. Ways in which HDMI cable 202 can be used are set forth below.

Example Techniques

The following discussion describes techniques for in-band peripheral authentication, which in many cases enable better use of host devices or peripherals for improved user experience. These techniques can be implemented utilizing the previously described environment, such as authenticator 118 and authentication module 132 of FIG. 1. These techniques include example methods illustrated in FIGS. 3 and 4, which are shown as operations performed by one or more entities. The orders in which these method blocks are described are not intended to be construed as a limitation, and any number or combination of the described method blocks can be combined in any order to implement a method, or an alternate method, including those drawing from both FIGS. 3 and 4.

Figure 3:
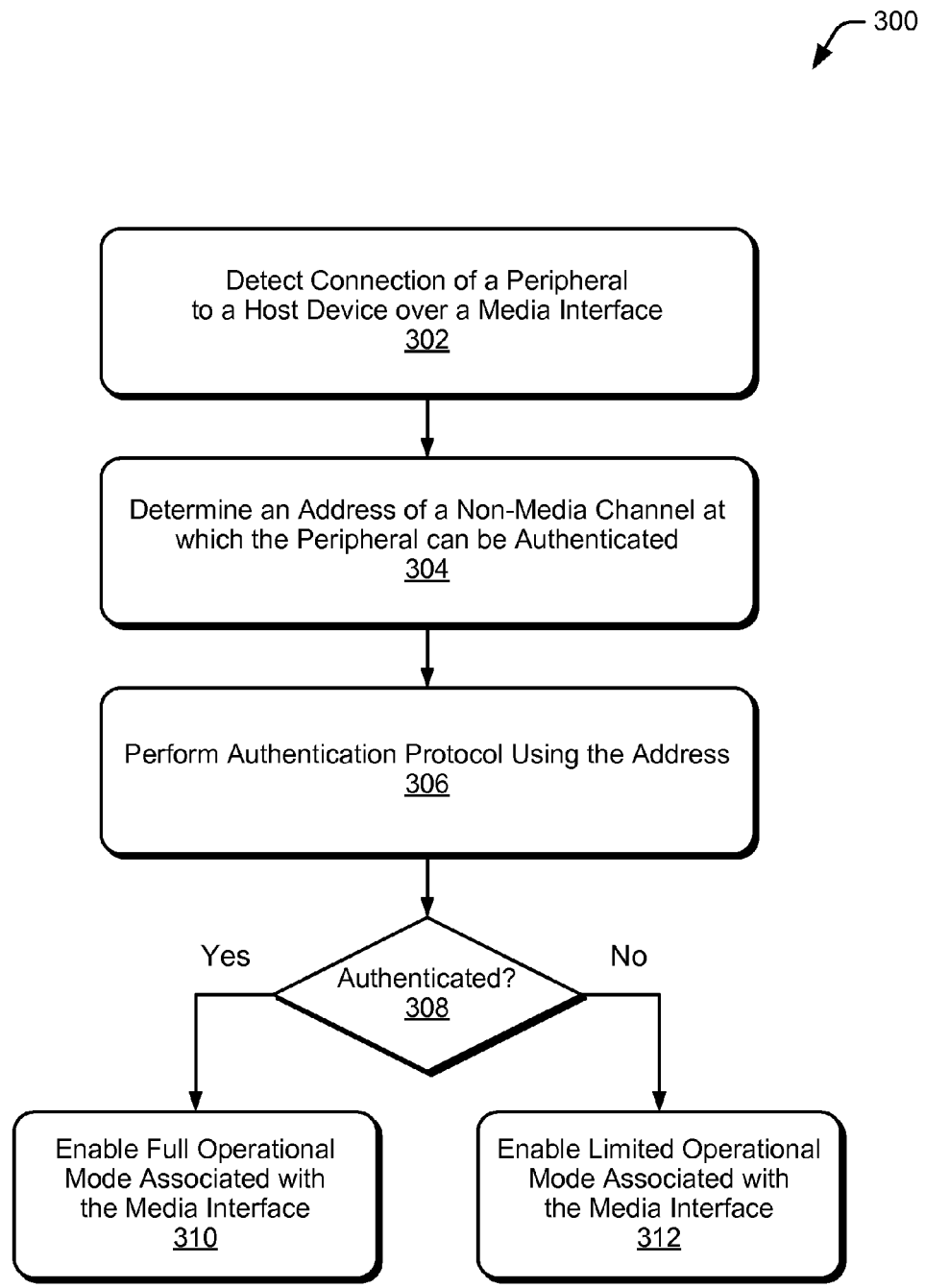
FIG. 3. illustrates example method(s) for in-band peripheral authentication performed at least in part by a host device.

FIG. 3 illustrates example method(s) 300 for in-band peripheral authentication performed at least in part by a host device.

At block 302, connection of a peripheral to a media interface is detected by a host device. Connection of the peripheral may be made directly to host device 102 (docking) or through a cable, such as HDMI cable 202. This media interface can include media channels for communicating video and/or audio information, and non-media channels for identification, control, and configuration of peripherals. Examples of media interfaces include HDMI, Digital Visual Interface (DVI), DisplayPort, and so on.

This video or audio information can be communicated as analog signals or digitally encoded data which may or may not be encrypted. The non-media channels may implement communication protocols such as I²C, DDC, E-DDC, HDCP, or other proprietary protocols for addressing peripherals. Detection of the connection by host device 102 can be responsive to a physical connection or a signal connection, such as HDMI cable 202 or laptop-dock 106-3.

Consider an example manner in which this connection is detected. In the context of example environment 100, when wired host port 114 of host device 102 and wired peripheral port 126 of docking station are connected by HDMI cable 202, host device 102 detects this connection via detect signal line 222. Alternately or additionally, host device 102 may sense connection when an attached cable or peripheral sinks current from 5V PWR signal line 224 and/or changes an impedance of other signal lines.

Authenticator 118 may actively monitor various signal lines of wired host port 114 to detect this connection, such as by observing voltage levels of signal lines or observing data transactions. Authenticator 118 may do so by detecting an enhanced display identification data (EDID) handshake between host device 102 and peripheral 106 over I²C channel 210. Additional examples and details concerning authenticator 118 are set forth elsewhere herein.

At block 304, an address of a non-media channel at which the peripheral can be authenticated is determined by the host device. Host device 102 may do so based on information received, by querying peripheral 106 (e.g., using device discovery), or based on a predefined range of addresses. Host device 102 may determine the address by using authenticator 118 to inspect EDID information or address information received from an entity within peripheral 106 or HDMI cable 202. Alternately or additionally, host device 102, through authenticator 118, can query peripheral 106 for the address or attempt to communicate with one or more predefined addresses.

At block 306, an authentication protocol is performed using the address to determine if the peripheral is authentic. Various manners of authentication can be used. In this ongoing example, authenticator 118 requests (or discovers) an identifier from peripheral 106. After an identifier is received from peripheral 106, authenticator 118 determines whether the identifier matches one of a set of authentic identifiers to determine authenticity of peripheral 106. This set of authentic identifiers is accessible by host device 102, such as by being stored in host media 112. If the identifier does not initially match, authenticator 118 can re-request an identifier from the peripheral and/or proceed with a challenge-and-response form of authentication, such as those based on a cryptographic algorithm or checksum. Note that the identifier received and the authentic identifiers of the set can be unique and/or cryptographically secure, though this is not required.

In one embodiment, authenticator 118 challenges peripheral 106 by sending a random number over the authentication-configured data lines. In response, peripheral 106 computes a response with a secret key and returns that response. Authenticator 118 receives that response, compares it with an expected response, and if they match, determines that peripheral 106 is authentic. To do so, authenticator 118 and peripheral 106 (e.g., using authentication module 132) perform one or more cryptographic algorithms.

A "Yes" path proceeds from block 308 to block 310 responsive to the peripheral providing the expected identifier and/or response, and a "No" path proceeds from block 308 to block 312 responsive to the peripheral not being authenticated due to an unexpected identifier and/or response to the challenge.

At block 310, a full operational mode associated with the media interface of the host device is enabled. This operational mode can include additional features and configurations, such as additional input/output capabilities associated with peripheral 106 or a context change of a user interface of host device 102. At the least, however, authenticator 118 enables this full operational mode and enables media to be provided to peripheral 106 via the media interface.

The media provided to peripheral 106 may be configured based on an EDID previously received or based on a type or class of peripheral 106 indicated by the identifier received. After peripheral 106 is authenticated, authenticator 118 may relinquish access of the non-media channel to HDMI module 120 allowing a multimedia communication and/or encryption thereof to be established. Alternately or additionally, the EDID data may include extended information associated with the peripheral, such as information describing capabilities or features supported by the peripheral. In such a case, the content of the extended EDID data may be signed and/or be validated via cryptographic operations of a handshake or other preliminary data exchange.

Authenticator 118 may also configure ways in which host device 102 may act and interact with peripheral 106. Consider a case where host device 102 is a smartphone physically connected or "docked" with laptop-dock 106-3, which provides an external display, keyboard, and additional ports. In such a case, authenticator 118 configures host 102 to make use of these functionalities, such as by configuring the media interface to provide content for the external display and configuring the non-media channel to receive input from the keyboard. In other cases, the non-media channel can be configured to exchange data between host device 102 and peripheral 106, such as general purpose I/O signals, button presses, status updates, short text messages, or tiny user interface messages.

Authenticator 118 can also configure host device 102 to automatically launch software applications or change a user interface context in response to determining that peripheral 106 is authentic. Examples include: a user interface for manipulating multimedia content for VGA display adapter 106-1 or liquid crystal display 106-2, changing a user interface from a default non-windowed context to a windowed context for laptop-dock 106-3, or an audio media-playing application for travel dock 106-5 (having speakers).

The content provided to the peripheral may not match content displayed on host device 102. For example, a slide show or presentation displayed via VGA display adapter 106-1 may not include user interface elements useful to control the slide show or presentation, which are presented on host device 102. As another example, multimedia audio may be routed via VGA display adapter 106-1, while in-call or voice-control audio may be routed to an audio system of host device 102, such as a speaker phone for hands-free operation. These are but a few of the many ways authenticator 118 can configure host device 102 in response to determining that peripheral 106 is authentic.

At block 312, a limited operational mode associated with the media interface of the host device is enabled. Authenticator 118 may disable the media interface from use, thereby halting communication with peripheral 106, such as when a peripheral is not authenticated. In some cases, however, authenticator 118 may configure the multimedia interface for limited use, such as by limiting a resolution or frame-rate of content provided, or disabling interactive features associated with the content, though this depends on the type of peripheral 106. At the least, authenticator 118 disables at least one, and up to all, configurations associated with the full operational mode described in relation to block 310.

For example, authenticator 118 may allow content to be provided to peripheral 106 via the media interface even when the peripheral is not authentic, but will limit features of peripheral 106 or of host device 102. In such a case, authenticator 118 may forgo automatically launching an application or limit a resolution of video content provided by the media interface. Assume, for example, that VGA display adapter 106-1 is not authenticated. Authenticator 118 limits a resolution of content provided to VGA adapter 106-1 and disables configuration(s) associated with an authentic VGA adapter 106-1.

Alternately or additionally, authenticator 118 may disable applications or features that enhance a user's experience based on an authentication status of peripheral 106. For example, video or touch based gesture recognition that allows a user to control content (e.g., a slide show presentation) remotely or via text can be disabled when a peripheral 106 is not authenticated or enabled when the peripheral 106 is authenticated. As another example, consider a 5V supply provided by a host device 102, which can provide additional current beyond the HDMI specification of 55 mA when a peripheral 106 is authenticated. In such a case, the additional current may enable a peripheral 106 to more-fully operate or provide additional capabilities.

Figure 4:
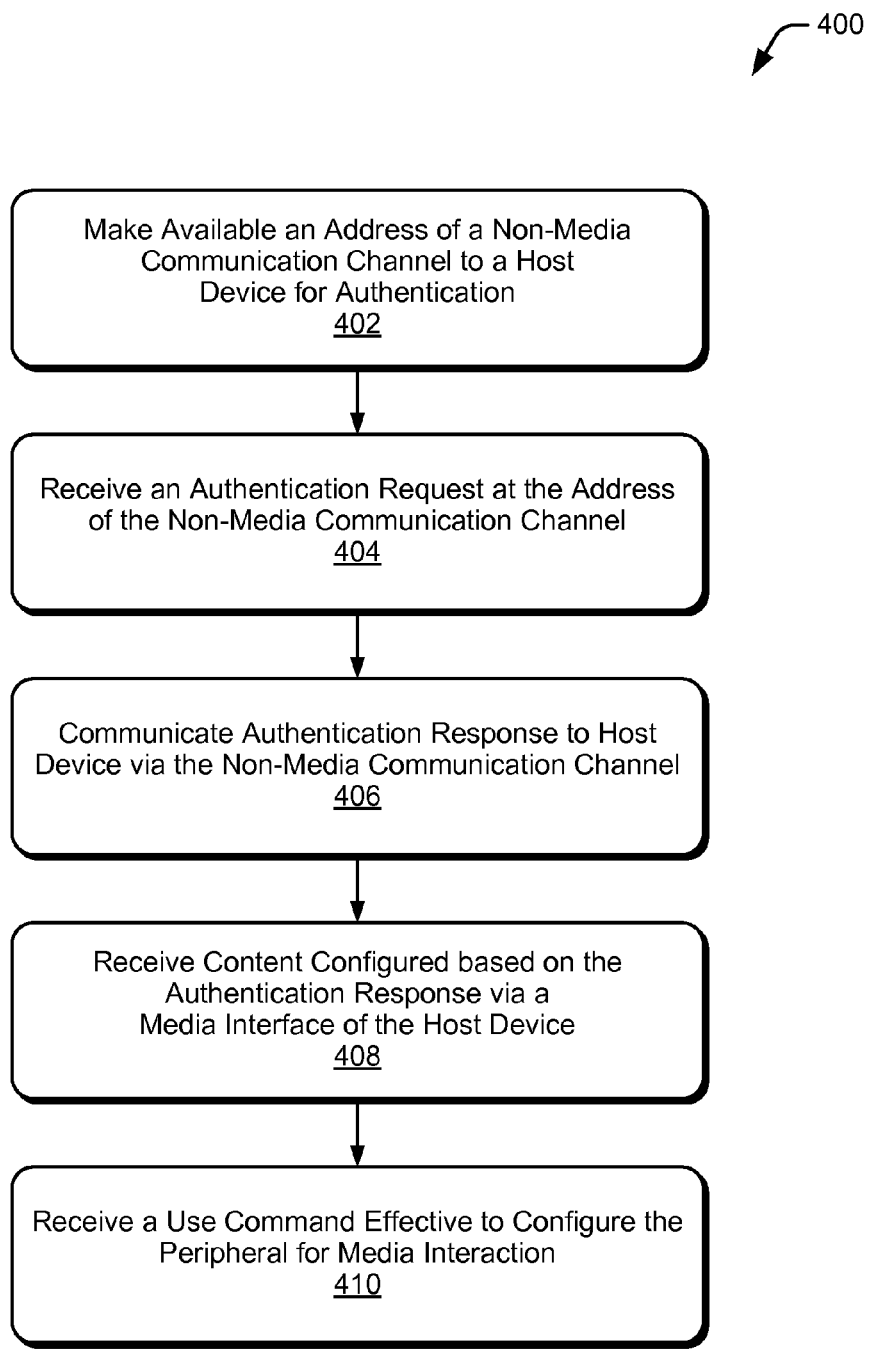
FIG. 4. illustrates example method(s) for in-band peripheral authentication performed at least in part by a peripheral to a host device.

FIG. 4 illustrates example method(s) 400 for in-band peripheral authentication performed at least in part by a peripheral to a host device. The order in which the method blocks are described are not intended to be construed as a limitation, and any number or combination of the described method blocks can be combined in any order to implement a method, or an alternate method.

At block 402, an address of a non-media channel is made available to a host device for authentication of a peripheral. The non-media channel can be associated with a media interface, which includes a media channel, such as HDMI. This address may be made available in various manners. For example, an indication of the address can be sent to host device 102 by authentication module 132 or the address may be presented in place of addresses of other components coupled to the non-media channel.

Authentication module 132 may also interrogate other components coupled to the non-media channel such as HDMI receiver 130 to determine an unused address to present to host device 102. This dynamic address configuration may be performed if a preferred static address of authentication module 132 is not available or not desireable. Information related to this address may be included in data communicated to host device 102 describing video capabilities of peripheral 106, such as EDID information.

Figure 5:
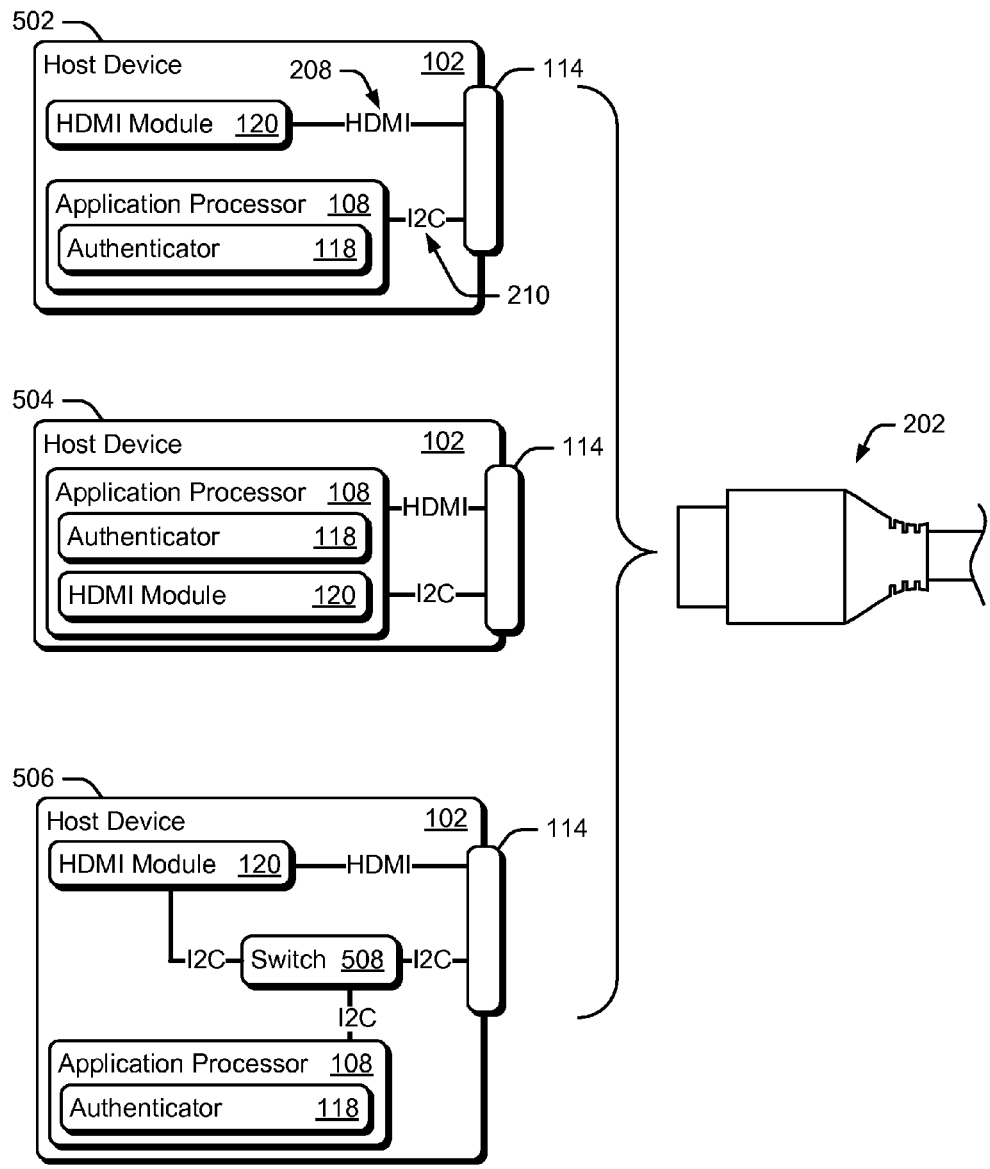
FIG. 5 illustrates examples of a host device configured for communication with a peripheral.
Figure 6:
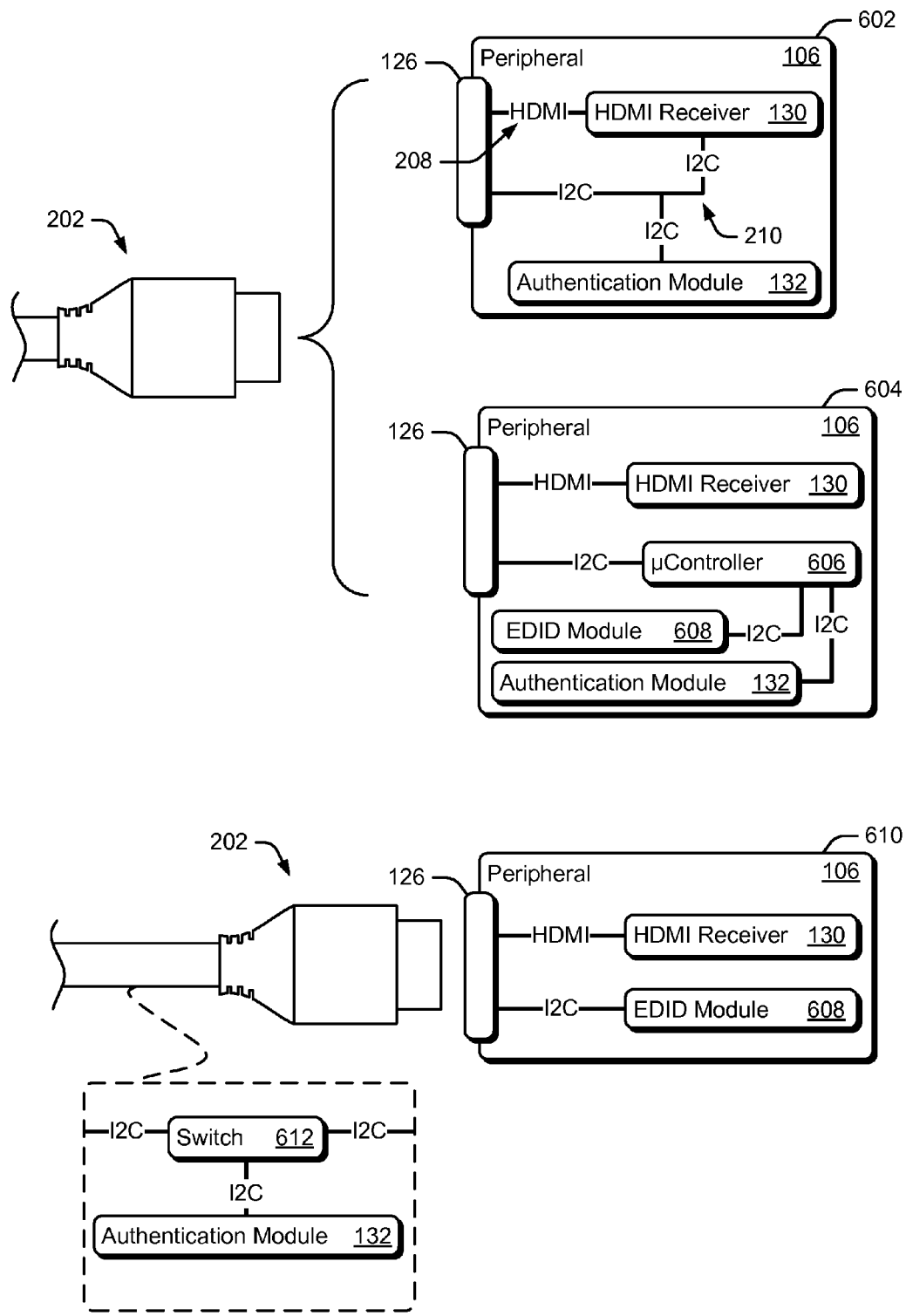
FIG. 6 illustrates examples of a peripheral device configured for communication with a host device.

FIG. 5 and FIG. 6 illustrate example configurations of host device 102 and peripheral 106, respectively, capable of performing in-band authentication through HDMI cable 202. Note, although illustrated here as communicating through HDMI cable 202, host device 102 and peripheral 106 may connect directly via docking (not shown). A docking connector may provide medium for a media interface, as well as power and/or other communication channels. In the context of these example configurations, the media interface is an HDMI interface including HDMI channel 208 and I$^2$C channel 210.

As illustrated by FIG. 5, configuration 502 of host device 102 implements HDMI module 120 separate from application processor 108, each of which are connected to wired host port 114. Here, application processor 108, using authenticator 118, can receive an indication of the address for authentication over I$^2$C channel 210. In some other cases, authenticator 118 and HDMI module 120 may be implemented by application processor 108 as shown in configuration 504, enabling application processor 108 to manage both communication channels of the media interface. Also consider configuration 506, which implements switch 508 to switch communication between HDMI module 120 and application processor 108. These are but a few host device configurations which may enable techniques of in-band peripheral authentication.

As illustrated in FIG. 6, from the perspective of peripheral 106, authentication module 132 communicates with components of host device 102 (e.g. authenticator 118) over I$^2$C channel 210. As shown in configuration 602, authentication module 132 can transmit an indication of its address directly on I$^2$C channel 210 when shared with HDMI receiver 130. In other cases, such as configuration 604, microcontroller 606 (μ Controller 606) can arbitrate communication of I$^2$C channel 210 between authentication module 132 and EDID module 608 during the authentication and identification process.

In yet other cases, peripheral 106 may not include authentication module, as shown in configuration 610. In such a case, HDMI cable 202 can include authentication module 132 and switch 612 presents either authentication module 132 or EDID module 608 to host device 102. As an example, consider a VGA display adapter 106-1 implemented as configuration 610. Here, switch 612 within HDMI cable 202 initially presents authentication module 132 to host device 102, enabling authentication module 132 to communicate address information and/or device information.

Returning to FIG. 4, at block 404, an authentication request is received from the host device at the address of the non-media channel. Various manners of authentication can be used. In this ongoing example, authentication module 132 receives a request for an identifier from host device 102 via I²C channel 210 of HDMI cable 202. This request can also include a cryptographic challenge based on an identifier.

At block 406, an authentication response is communicated to the host device via the non-media channel. This response may include an identifier, which may identify various aspects of peripheral 106 including a peripheral type, a peripheral class, a manufacturer, functionalities made available by peripheral 106, and so on. This identifier is accessible from peripheral 106, such as being stored in peripheral media 124, can be unique and/or cryptographically secure, though this is not required. Authentication module 132 may also encrypt the identifier prior to communicating or include a cryptographic response if so requested by host device 102. For the ongoing example, authentication module 132 communicates an identifier to host device 102 which identifies VGA display adapter 106-1 by type and manufacturer.

At block 408, content configured based on the authentication response is received from the host device via the media interface. This content can be configured to make use of features made available by peripheral 106, such as increased display resolution, speakers, or additional user inputs. For example, when host device 102 is connected (docked) to laptop-dock 106-3, a user interface associated with the content may not feature on-screen controls because a keyboard of laptop-dock 106-3 can be used for input. As noted above, however, content provided via the media interface can also be limited or disabled based on the authentication of peripheral 106. In the ongoing example, content is provided by the media interface to VGA display adapter 106-1 without user interface elements based on peripheral class. Here, host device 102 has associated a media presentation mode with the peripheral class of display adapters, and provides the content at high resolution without user interface elements which may occlude the media when displayed.

At block 410, a use command is received from the host device via the non-media channel, the use command effective to configure the peripheral for media interaction. This use command, when received from host device 102 by peripheral 106, affects functions of peripheral 106. For example, when host device 102 is connected to laptop-dock 106-3, a use command can enable the external display, speakers, keyboard, and other functionalities of laptop-dock 106-3. Host device 102, however, may also or instead limit various functions of peripheral 106 based on the authenticity of peripheral 106. Concluding the ongoing example, VGA adapter 106-1 receives a use command that enables configuration of HDMI module 120 for displaying the content provided by the media interface.

Consider another case where peripheral 106 is laptop-dock 106-3, which is authenticated by host device 102. In such a case, host device 102 enters a full operational mode, which enables the media interface, including HDMI channel 208. Host device 102 also launches applications associated with laptop-dock (e.g., printing or productivity applications) and changes a context of its current user interface to a windowed environment. A use command may also be communicated that enables features of laptop-dock 106-3 such as a display, keyboard, speakers, status indicators, and so on. In an alternate case, where laptop-dock 106-3 is not authenticated, peripheral 106 may not receive this use command, and host device 102 may disable the media interface (including HDMI channel 208 and I²C channel 210). As shown here, authenticator 118 may limit functions and services of host device 102 whether or not authenticator 118 limits peripheral 106. Although illustrated in the above figures as a wired medium, communication medium 104 may be implemented with a wireless medium, which may include one or more wireless endpoints or dongles having any combination of components described with respect to FIGS. 1-6.

Example Peripheral

Figure 7:
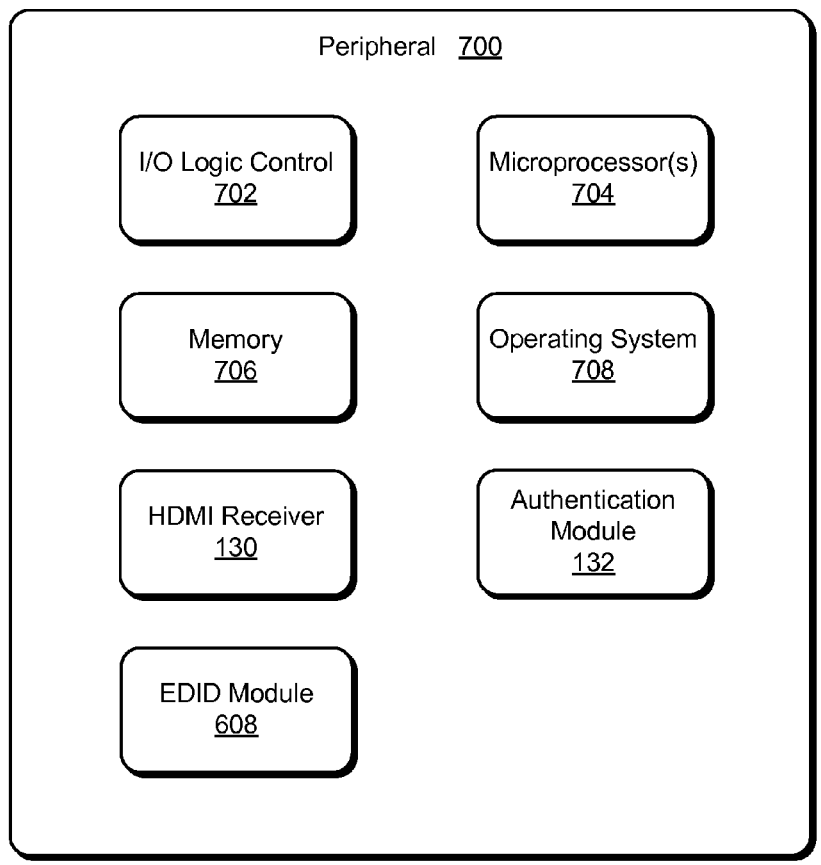
FIG. 7 illustrates various components of an example peripheral that can implement techniques for in-band peripheral authentication.

FIG. 7 illustrates various components of an example peripheral 700, which is implemented in hardware, firmware, and/or software, or as described with reference to any of the previous FIGS. 1-6 to implement in-band peripheral authentication.

Example peripheral 700 can be implemented in a fixed or mobile device being one or a combination of a media device, computer device, television set-top box, video processing and/or rendering device, appliance device (e.g., a closed-and-sealed computing resource, such as some digital video recorders or global-positioning-satellite devices), gaming device, electronic device, vehicle, workstation, WLAN peer device/client station, and/or in any other type of device that may communicate through a wired or wireless communication medium to a host device. Examples of some of these are shown in FIG. 1 at 106.

Example peripheral 700 can be integrated with electronic circuitry, a microprocessor, memory, input-output (I/O) logic control, communication interfaces and components, other hardware, firmware, and/or software needed to run an entire device. Example peripheral 700 can also include an integrated data bus (not shown) that couples the various components of the peripheral for data communication between the components.

Example peripheral 700 includes various components such as an input-output (I/O) logic control 702 (e.g., to include electronic circuitry) and a microprocessor 704 (e.g., any of a microcontroller or digital signal processor). Example peripheral 700 also includes a memory 706, which can be any type of random access memory (RAM), a low-latency nonvolatile memory (e.g., flash memory), read only memory (ROM), and/or other suitable electronic data storage. Example peripheral 700 can also include various firmware and/or software, such as an operating system 708, which can be computer-executable instructions maintained by memory 706 and executed by microprocessor 704. Example peripheral 700 can also include other various communication interfaces and components, wireless LAN (WLAN) or PAN (WPAN) components, other hardware, firmware, and/or software.

Example peripheral 700 includes HDMI receiver 130, authentication module 132, and EDID module 608. Examples of these components and their functions are described with reference to the respective components as shown in FIGS. 1, 5, and/or 6.

Authentication module 132 in example peripheral 700, either independently or in combination with other entities, can be implemented as computer-executable instructions maintained by memory 706 and executed by microprocessor 704 to implement various embodiments and/or features described herein. Authentication module 132 may also be provided integral with other entities of the peripheral, such as integrated with configuration switch 508. Alternatively or additionally, authentication module 132 and the other components can be implemented as hardware, firmware, fixed logic circuitry, or any combination thereof that is implemented in connection with the I/O logic control 702 and/or other signal processing and control circuits of example peripheral 700.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
   determining an address of a non-media channel at which a peripheral communicatively coupled to a media interface of a host device can be authenticated by the host device;
   performing an authentication protocol using the address at which the peripheral can be authenticated;
   responsive to the peripheral being authenticated, enabling a full operational mode between the host device and the media interface, wherein the full operational mode includes configuring the media interface to provide content to a component of the peripheral via a media channel and receive input data from another component of the peripheral via the non-media channel; and
   responsive to the peripheral not being authenticated, enabling a limited operational mode between the host device and the media interface, wherein the limited operational mode includes limiting the quality of media provided via the media channel of the media interface.

2. The method as recited in claim 1, wherein the determining includes receiving address information from the peripheral via the non-media channel.

3. The method as recited in claim 1, wherein the full operational mode includes:
   a windowed user interface context that is different from a non-windowed user interface context enabled when the peripheral is not connected to the host device.

4. The method as recited in claim 1, wherein the full operational mode comprises:
   a user interface context for manipulating media provided to the peripheral via the media interface.

5. The method as recited in claim 4, wherein a representation of graphic elements of the user interface context is not provided to the peripheral via the media interface.

6. The method as recited in claim 1, wherein the full operational mode includes a capability to receive general purpose input/output signals, status information, or short messages from the peripheral via the non-media channel.

7. The method as recited in claim 1, wherein the enabling the limited operational mode includes:
   disabling one or more capabilities of the host device.

8. The method as recited in claim 1, wherein performing the authentication protocol includes:
   receiving an identifier from the peripheral;
   determining whether the identifier matches one of a set of authentic identifiers; and
   challenging the peripheral through the non-media channel responsive to the identifier matching one of the set of authentic identifiers.

9. The method as recited in claim 1, further comprising:
   causing the host device to increase an amount of current output to a connector of the non-media channel, or re-route an audio channel, in response to the peripheral being authenticated.

10. The method as recited in claim 1, further comprising:
    configuring the full operational mode based on digitally signed enhanced display identification data (EDID) that includes address information, capabilities, or features of the peripheral.

11. A method, comprising:
    making available an address of a non-media channel to a host device for authentication of a peripheral communicatively coupled to a media interface of the host device;
    receiving an authentication request from the host device at the address of the non-media channel;
    communicating an authentication response to the host device via the non-media channel; and
    receiving, via the media interface of the host device, content configured for the peripheral based on the authentication response communicated to the host device,
       wherein, responsive to the peripheral being authenticated, a component of the peripheral receives the content via a media channel of the media interface and another component of the peripheral provides input data to the non-media channel of the media interface, and
       wherein, responsive to the peripheral not being authenticated, the received content is of limited media quality.

12. The method as recited in claim 11, further comprising:
    receiving a use command effective to configure the peripheral for media interaction, the use command based on the authentication response communicated to the host device.

13. The method as recited in claim 11, wherein making available the address includes:
    presenting the address for the authentication of the peripheral instead of another address for identifying or authenticating a media interface component of the peripheral.

14. The method as recited in claim 11, wherein making available the address includes:
    determining an unused address of the non-media channel and presenting the unused address to the host device.

15. The method as recited in claim 11, wherein other addresses of the non-media channel identify a component capable of indicating media capabilities of the peripheral or a component for encrypting contents of the media interface.

16. The method as recited in claim 11, further comprising:
    communicating information identifying media capabilities of the peripheral to the host device.

17. The method as recited in claim 11, wherein the content configured for the peripheral includes:
    a windowed user interface context that is manipulable via inputs of the peripheral.

18. The method as recited in claim 11, wherein the content configured for the peripheral includes:
    multimedia content without user interface elements for manipulating the multimedia content.

19. A peripheral comprising:
    an authentication module configured to communicate an authentication response to an authentication request received from a host device via a non-media channel;
    a communication switch configured to, responsive to connection to the host device, switch the non-media channel from a media interface module of the peripheral to the authentication module of the peripheral to enable authentication of the peripheral;
    a processor configured to receive, via the media interface of the host device, content configured for the peripheral based on the authentication response communicated to the host device,
       wherein, responsive to the peripheral being authenticated, a component of the peripheral receives the content via a media channel of the media interface and another component of the peripheral provides input data to a non-media channel of the media interface, and wherein, responsive to the peripheral not being authenticated, the received content is of limited media quality.

20. A peripheral comprising:

an authentication module configured to communicate a response to an authentication request received from a host device via a non-media channel, the response useful to authenticate the peripheral;

a communication switch configured to, responsive to connection to the host device, switch the non-media channel from a media interface module of the peripheral to the authentication module of the peripheral to enable authentication of the peripheral; and a cable coupled to the peripheral, wherein the communication switch is located within the cable.

21. The peripheral as recited in claim 19, wherein the non-media channel is compliant with an inter-integrated circuit ($I^2C$) or a display data channel (DDC) protocol.

* * * * *